Aug. 6, 1968        H. COHEN        3,396,040
PROCESS FOR PRESERVING CITRUS FRUIT FOOD PRODUCTS
Filed July 10, 1964
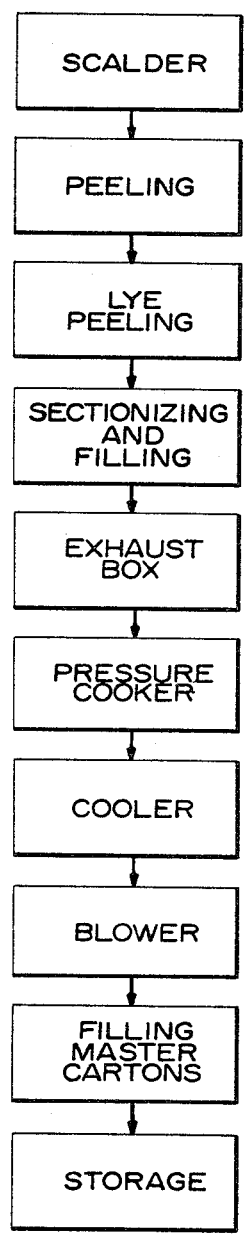
Herman Cohen
INVENTOR
BY Jacobi & Davidson
ATTORNEYS United States Patent Office 3,396,040
Patented Aug. 6, 1968

3,396,040
PROCESS FOR PRESERVING CITRUS
FRUIT FOOD PRODUCTS
Herman Cohen, 235 W. Winter Park Ave.,
Orlando, Fla. 32804
Continuation-in-part of application Ser. No. 348,849,
Mar. 2, 1964. This application July 10, 1964, Ser.
No. 381,783
4 Claims. (Cl. 99—186)

ABSTRACT OF THE DISCLOSURE

Preservation of peeled and sectionalized citrus fruits by cooking the fruit in a closed, partially vacuumized glass container at gauge pressures between 5 and 15 p.s.i. and at temperatures between 225° F. and 250° F. with subsequent cooling of the container and its contents.

---

This application is a continuation-in-part of my copending application entitled Process for Preserving Citrus Fruit Food Products, filed Mar. 2, 1964, and assigned Serial Number 348,849 now abandoned.

The present invention relates to the processing of containerized citrus products.

In the continuous or batch type processing of sectionized fruit it has heretofore been the practice to process such fruits in tin cans by cooking the fruit at predetermined temperatures usually below the boiling point of water for varying periods of time between 25 to 40 minutes, the actual times and temperatures depending on the type and maturity of the fruit which was being processed. Such processing operations, however, were found to bring about a tinny flavor in the processed fruit as well as rendering the same undesirably soft due to the long period of cooking. The tinny flavor was found to become more profound as the period of storage was prolonged. The fruit further became discolored after minimal periods of storage in the tin cans and continued to take on a more brownish color as storage time was prolonged.

Due to the undesirable properties of the fruit sections which were processed in the above described manner, and with the advent of refrigeration, the food processors in the citrus fruit industry attempted to eliminate the disadvantages and drawbacks of the prior process. These processors turned to refrigeration to preserve the citrus fruit in a more desirable manner. The tinny flavor was eliminated as well as the discoloring of the fruit and the softness thereof. However, in order to obtain these more desirable results with the refrigeration process, the industry found that it was necessary to supplement the syrup or citrus fruit juices which the fruit sections were stored in, with benzoate of soda. Approximately one tenth of 1% benzoate of soda was added to the syrup or fruit juices in order to prevent deterioration of the citrus sections upon prolonged storage. As a result of such supplementation, it was found that the fruit when eaten created a slight burning sensation to the tongue. As a further drawback to this process, it was found that the cost of refrigeration was exceedingly high. This high cost was brought about by the fact that it was necessary to continually refrigerate the containers and the contents thereof from the time of processing until the time at which the fruit sections were purchased by the consumer. Thus, it was further necessary to refrigerate any transportation vehicles which carried the processed fruit sections.

In view of the preceding discussion of past and present methods of operation in the fruit processing industry, it is a primary object of the present invention to provide a dependable and efficient method of processing fruit sections wherein the objections to the presently known methods as well as the objections to the methods previously used, are avoided.

It is another primary object of the present invention to provide a process of preserving citrus fruit sections in such a manner so as to retain the natural flavor of the fresh fruit as well as the stability or firmness of the fruit sections and to maintain the original color of the fruit after prolonged periods of storage.

Still another and further object of the present invention is to provide a process for preserving citrus fruit sections in containers which are sealed so as to provide a partial vacuum condition within the containers during the period of storage. In line with this object of the present invention, it is a further object of the present invention to partially fill the containers with fruit sections to a predetermined level and maintain the same in a solution such as syrup and/or citrus fruit juices for preserving the fruit sections in a manner which results in an acceptable fruit condition when purchased by the consumer.

Another object of the present invention is to provide a reliable process to preserve citrus fruit sections such as oranges, grapefruits and combinations thereof by cooking the same in containers at predetermined temperatures and pressures for predetermined periods of time. In connection with the preceding object of the present invention, it is a further object of the invention to cool the containers and the contents therein as rapidly as possible to approximately room temperature for storing the same and shipping to the commercial outlet.

Still another further object of the present invention is to provide a process for preserving citrus fruit sections such as previously described, which process includes the use of containers comprising a glass composition or other materials having similar characteristics and properties which are capable of withstanding heat, cooling and other such operations connected with the present process, rather than tin cans or other known receptacles presently used in the fruit processing industry.

Consistent with the preceding basic and elementary objects of the present invention, there are certain other objects hereof including the following:

(a) The provision of such a process wherein the basic sequential steps performed include a preliminary scalding of the various fruits to be preserved an initial peeling of the outer skin from the fruits, a lye peeling to substantially remove all covering from the fruit, sectionizing and filling of the fruit sections into suitable containers, exhausting substantially all air from the unfilled portions of the containers, cooking the fruit sections under pressure and then cooling the containers and the contents therein;

(b) The provision of such a process wherein the respective operational steps are carried out in a sequence where certain operations in the sequence are carried out at predetermined ranges of temperature and pressure and for pre-selected periods of time;

(c) The provision of such a process which utilizes a particular density of syrup capable of effectively maintaining the fruit sections at a desired degree of firmness, similar to freshly sectionized citrus, and maintaining the color of the fruit sections as close to the normal color of fresh citrus fruit as possible, and to further maintain the desired taste of the fresh citrus fruit sections; and (d) The provision of such a process which can be carried out efficiently in a continuous or batch type operation and in such a manner as to minimize operational costs.

In the process of the present invention, the citrus fruit products are first treated in such a manner as to allow for rapid and efficient peeling of the skin from the surface of the citrus fruit. Such treatment usually includes scalding of the citrus fruit wherein sufficiently high temperatures and resultant heat are applied thereto so that peeling of the skin therefrom, either manually or by automatic means, can be readily accomplished.

It is desirable to pass the fruit through a peeling and lye peeling operation that completely removes the outer skin or surface covering from the fruits such as grapefruits, oranges, and the like, so that the fruit itself can be sectioned and placed in a suitable container. After sectionizing and filling of the various types of fruits in the desired containers, the process contemplates either adding a syrup solution, citrus juice or combination of juice and syrup, to the partially filled containers or having the syrup or juice placed therein before the containers are filled with the sectionized fruit. The containers and contents therein are then run through an exhaust box to heat the container and contents forcing the air in the container to expand which will create a vacuum upon being cooled. A suitable closure is then placed on the individual containers so as to maintain the partial vacuum therein. In order to maintain the desired taste, color and stability of the fruit sections, the same are cooked under pressure in a retort or other desired receptacle for a predetermined period of time and at a desired range of pressures and temperatures. After such cooking, the containers are removed from the retort or other type of cooking receptacle and then cooled by air blowing, water spray, or other conventional cooling techniques until a desired cooling temperature is reached.

The invention resides in a particular sequence of operations, in the manner in which such operations are performed, and in the particular ranges of temperature, pressure, and periods of time for carrying out certain operations in the overall sequence. The invention will be better understood and objects other than those specifically set forth above will become apparent, when consideration is given to the following detailed description. Such description makes reference to the annexed drawing.

The single figure of the drawing is a diagrammatic view showing the essential steps in the preferred process of preserving citrus fruit sections.

By way of example, let it be assumed that grapefruits and oranges are to be combined for ultimate sale to the consumer at some later time. It should be understood however, that any combination of fruits can be selected or individual fruits may be separately processed. The oranges and grapefruits are first scalded in a conventional manner such as subjecting the fruits to superheated steam or boiling water so that the outer skin of the grapefruits and oranges is sufficiently prepared for the peeling operation which will remove the outer skin from the fruits. Inasmuch as the peeling operation does not substantially remove all of the covering on the fruit itself, it is desirable to subject the same to a lye peeling operation wherein all of the outer surface of skin is removed therefrom. The oranges and grapefruits are then cut or sectionalized into varying numbers and sizes of pieces depending on the initial size of the grapefruits and oranges. This sectionalized fruit is then placed in a container which can be of any selected size and which can either be initially partially filled with a syrup solution or subsequently partially filled with the syrup solution after the jars are partially filled with the fruit sections.

Consistent with the invention, the container used can take various forms and can be made of various different materials. It has been found, however, that glass containers can be processed according to the invention quite efficiently. Still, containers made from synthetic materials and/or metals can be processed according hereto without departing from the teachings hereof. In any event, the container should be capable of withstanding the temperatures, pressures, and other processing environment characteristics. For convenience, it is assumed in the following discussion that glass containers are being utilized, but this assumption is made subject to the understanding that plastic, metal or other types of containers can be employed.

Again referring to the invention itself, it should be noted that the container or jar is only filled with fruit to approximately one quarter of an inch from the top thereof so that the jar when placed in the exhaust box may be exhausted of substantially all air in the unfilled portion of the jar, thereby creating a partial vacuum therein. It has been found that the container usually requires approximately one eighth of its volume to be filled with the citrus juice or syrup so that the fruit will be covered by the syrup or juice when placed therein. Approximately one quarter of an inch at the uppermost portion of the container is sufficient for the partial vacuum when a suitable closure is secured to the container.

Although the particular syrup which is used in connection with the present process is not critical nor determinative of the particular sequence of steps involved, it has been found that the syrup can be of a density range determined merely by the degree of sweetness associated with the syrup. In this regard, the solution might have a density of from 0° Brix to 55° Brix. When the Brix density is between 0° and 16° Brix, the solution would be classified as sweetened water. When the density of the solution is between 16° Brix and 18° Brix, it would be classified as light syrup. When the density of the solution is 18° Brix and above, the solution is classified as heavy syrup. The term "° Brix" is a classification of solution expressing the percentage by weight of pure sucrose or dextrose or combination of the two, to the percentage of weight of water. Such terminology is conventional in the food processing industry and accepted by the U.S. Department of Agriculture as set forth in the well known so-called "A.O.A.C. Book."

After the glass jars have been sealed by a suitable closure in the exhaust box, so that the partial vacuum condition in the unfilled portion of the jars is maintained, the same are transferred to a continuous pressure cooker or retort cooker of the pressure type wherein the contents of the glass jars are cooked for a predetermined period of time. More particularly, the cooker is maintained under a pressure of between 2 lbs. per square inch and 20 lbs. per square inch, but preferably between 5 lbs. per square inch and 15 lbs. per square inch. While the desired range of pressure is maintained in the cooker, the glass jar and contents therein are subjected to a temperature in the range between 200° F. and 275° F. but preferably between 225° F. and 250° F. Both the desired range of pressure and the desired range of temperature are maintained for a period of time between 2 to 12 minutes depending on the particular fruits which are contained in the glass jars and the sizes of the same.

Due to the above described sequence of steps, the citrus fruit sections retain their natural flavor of the fresh fruit as well as retaining the firmness of the fresh fruit. Moreover, it has been found that this particular sequence of steps prevents very little change in color of the fruit if the same is kept in a relatively unlit area. However, in those instances where the glass jars are stored under bright light for a long period of time, there may be a very slight change in color.

The glass jars and the contents thereof are transferred from the cooker to a cooler wherein the glass jars are cooled down to a temperature which is normally that of room temperature. The more rapid the cooling, the greater period of time for storage which is afforded thereby. In connections with this cooling operation, it has been found that a water spray or a forced air cooling is sufficient to rapidly cool the glass containers.

The glass containers are removed from the cooling area after the same have been sufficiently cooled and placed in the master cartons for transportation to storage. It should be noted that the processing operations may take place in a continuous or batch type operation. In those cases where a retort type pressure cooker is used, the process can very well become a continuous one. In this case, automation comes into play in the transportation of the fruit and the containers from one sequential step to the other. However, a batch type operation can very well be adapted to the process for preserving citrus fruits set forth above.

It will be seen from the above, that by the process of the present invention the problems which have arisen in connection with present processing practices such as the change in taste, color and stability of fresh fruit have been eliminated.

After reading the foregoing detailed description of the process for preserving citrus fruits hereof, it should be appreciated that the objects set forth at the outset of the present specification have been successfully achieved. Accordingly,

What I claim is:

1. In a process for preserving peeled and sectionalized citrus fruit in a glass container having such citrus fruit therein, including filling the container to a level below the top thereof, the improvement comprising the steps of:
   (a) partially filling said container with a syrup;
   (b) placing said glass container and its contents in a vacuum chamber to establish a partial vacuum in the unfilled portion of said container;
   (c) while maintaining the partial vacuum in said container, closing the top thereof with a suitable closure;
   (d) placing the closed container under a pressure of between 5 pounds per square inch and 15 pounds per square inch and while maintaining the pressure, cooking the same at a temperature of between 225° F. and 250° F. for a period of time between 2 to 12 minutes; and then,
   (e) cooling said container and its contents to room temperature.

2. The process of claim 1, wherein step (a) is carried out with a syrup solution having a density of between 0 degree Brix and 55 degrees Brix and wherein said syrup consists essentially of at least one ingredient selected from the group consisting of water, citrus juice, dextrose, sucrose and mixtures thereof.

3. The process of claim 1 wherein said fruit is selected from the group consisting of oranges, grapefruits, and mixtures thereof.

4. The process of claim 1 wherein said glass container is filled with a solution selected from the group consisting of syrup, citrus juices, and mixtures thereof.

References Cited

Cruess et al., Home Canning, August 1962, pages 18–24.

The Canning Trade, A Complete Course in Canning, 5th ed., May 1924, pages 37–48.

RAYMOND N. JONES, *Primary Examiner.*

M. VOET, *Assistant Examiner.*